United States Patent [19]

Lishman

[11] Patent Number: 5,020,261
[45] Date of Patent: Jun. 4, 1991

[54] MOISTURE SENSITIVE SELF-WATERING PLANTER

[76] Inventor: Fred W. Lishman, 7770 Marshall Heights Ct., Falls Church, Va. 22043

[21] Appl. No.: 284,897

[22] Filed: Dec. 15, 1988

Related U.S. Application Data

[63] Continuation-in-part of Ser. No. 143,767, Jan. 14, 1988, abandoned.

[51] Int. Cl.$^5$ ............................................. A01G 27/00
[52] U.S. Cl. ............................................. 47/79; 47/39
[58] Field of Search .................. 47/62, 63, 79, 80, 81, 47/67, 39, 48.5

[56] References Cited

U.S. PATENT DOCUMENTS

| | | | |
|---|---|---|---|
| 1,231,976 | 7/1917 | Weitzel | 47/79 |
| 1,555,675 | 9/1925 | Kruszynski | 47/79 |
| 3,168,797 | 2/1965 | Patassy | 47/79 |
| 3,293,799 | 12/1966 | Keller | 47/79 |
| 3,906,667 | 9/1975 | Williams | 47/79 |
| 4,060,934 | 12/1977 | Skaggs | 47/79 |
| 4,092,802 | 6/1978 | Oyama | 47/16 |
| 4,557,071 | 12/1985 | Fah | 47/48.5 X |
| 4,760,666 | 8/1988 | Han | 47/79 |

FOREIGN PATENT DOCUMENTS

| | | | |
|---|---|---|---|
| 2632347 | 1/1978 | Fed. Rep. of Germany | 47/79 |
| 841340 | 5/1939 | France | 47/79 |

Primary Examiner—Danton D. DeMille

[57] ABSTRACT

A moisture sensitive self-watering planter utilizes a control valve to effect watering of the soil in a liner of the planter upon automatic detection of a predetermined level of dryness of the soil. The planter uses a weight-based system of detecting the amount of moisture in the soil to control the automatic release of a predetermined amount of water into the soil for rehydration thereof. As the weight of the soil increases with the volume of water, the valve is automatically closed to terminate the irrigation process.

9 Claims, 6 Drawing Sheets

MOISTURE SENSITIVE SELF-WATERING PLANTER

This is a continuation-in-part of application Ser. No. 143,767 filed Jan. 14, 1988, now abandoned.

BACKGROUND OF THE INVENTION

This invention relates generally to planters for potting of plants, and more particularly to a planter for performing automatic irrigation of a plant potted therein based upon the constant monitoring of the moisture content of the soil.

The present invention ensures a constant supply of water to a potted plant for an extended period of time without the inconvenience and necessity of manual watering of the plant. The self-watering planter of the present invention is a self-contained and aesthetically pleasing unit that basically resembles an ordinary plant pot. The present invention may also allow periodic drying out of the roots prior to rehydration if desirable, which thereby ensures the health of the plant.

SUMMARY OF THE INVENTION

It is thus an object of the present invention to eliminate the need for periodic watering of a potted plant by a plant owner.

It is a further object of the present invention to provide a self-watering planter which is self-contained and aesthetically pleasing and is readily portable.

It is a still further object of the present invention to provide a moisture sensitive self-watering planter which effects watering of the soil in the planter upon detection of a predetermined level of dryness of the soil, based upon the weight of a liner in the planter.

The objects of the present invention are fulfilled by providing a self-watering planter comprising, in a first preferred embodiment, a cylindrical housing unit having interior and exterior wall members, a cylindrical reservoir located at a top portion of the housing unit between the interior and exterior walls, a liner to be filled with soil into which a plant is potted, removably located within the housing unit adjacent the interior wall, weight determination means, supporting the liner within the housing unit, for determining the weight of the liner which is indicative of the moisture content of the soil, a feeder tube extending from the reservoir and terminating over the liner for hydrating the soil within the liner, valve means connecting the tube to the reservoir for selectively allowing water to be delivered to the soil, and control means, responsive to the weight determination means determining a specific weight of said liner for opening and closing the valve means when the weight of the liner reaches first and second specific values respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
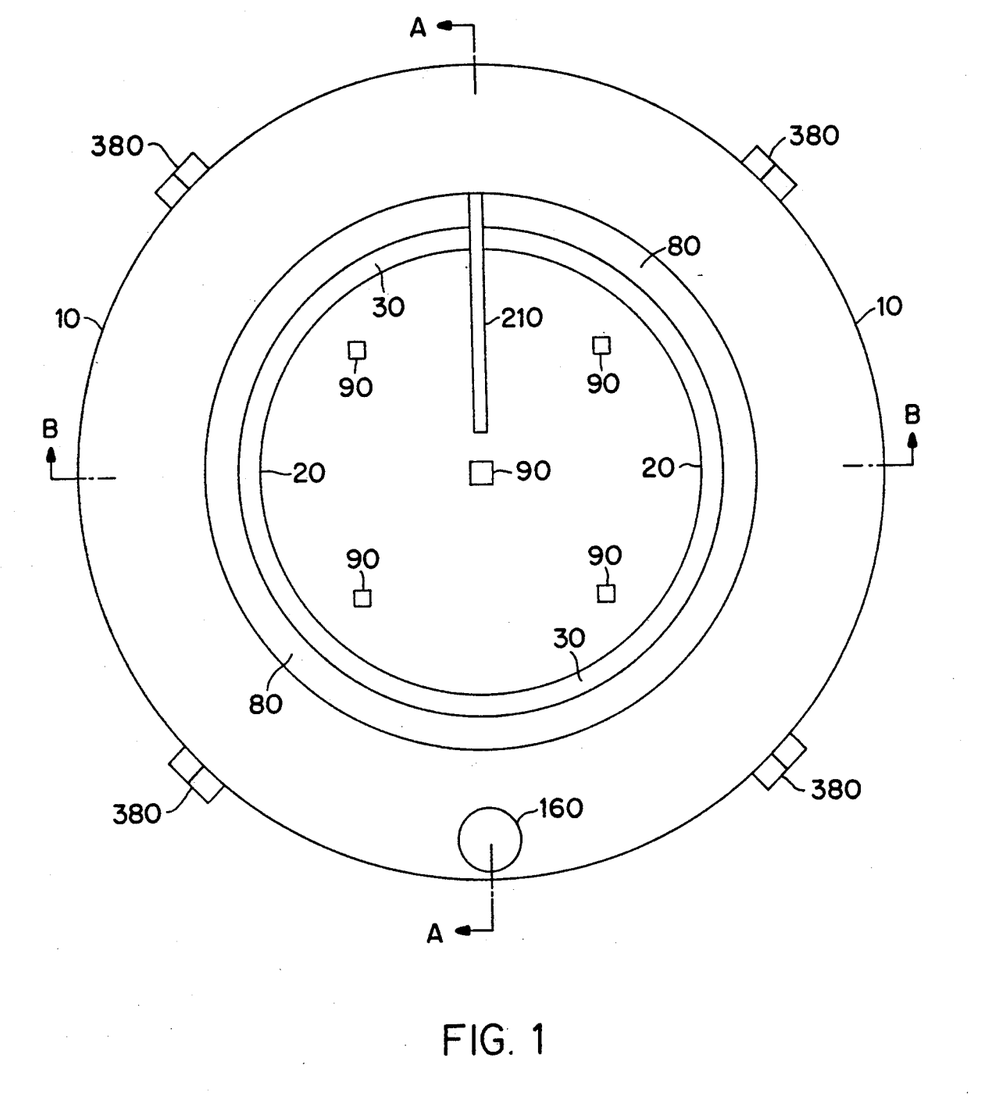
FIG. 1 is a plan view of the top of the self-watering planter of one preferred embodiment of the present invention.
Figure 2:
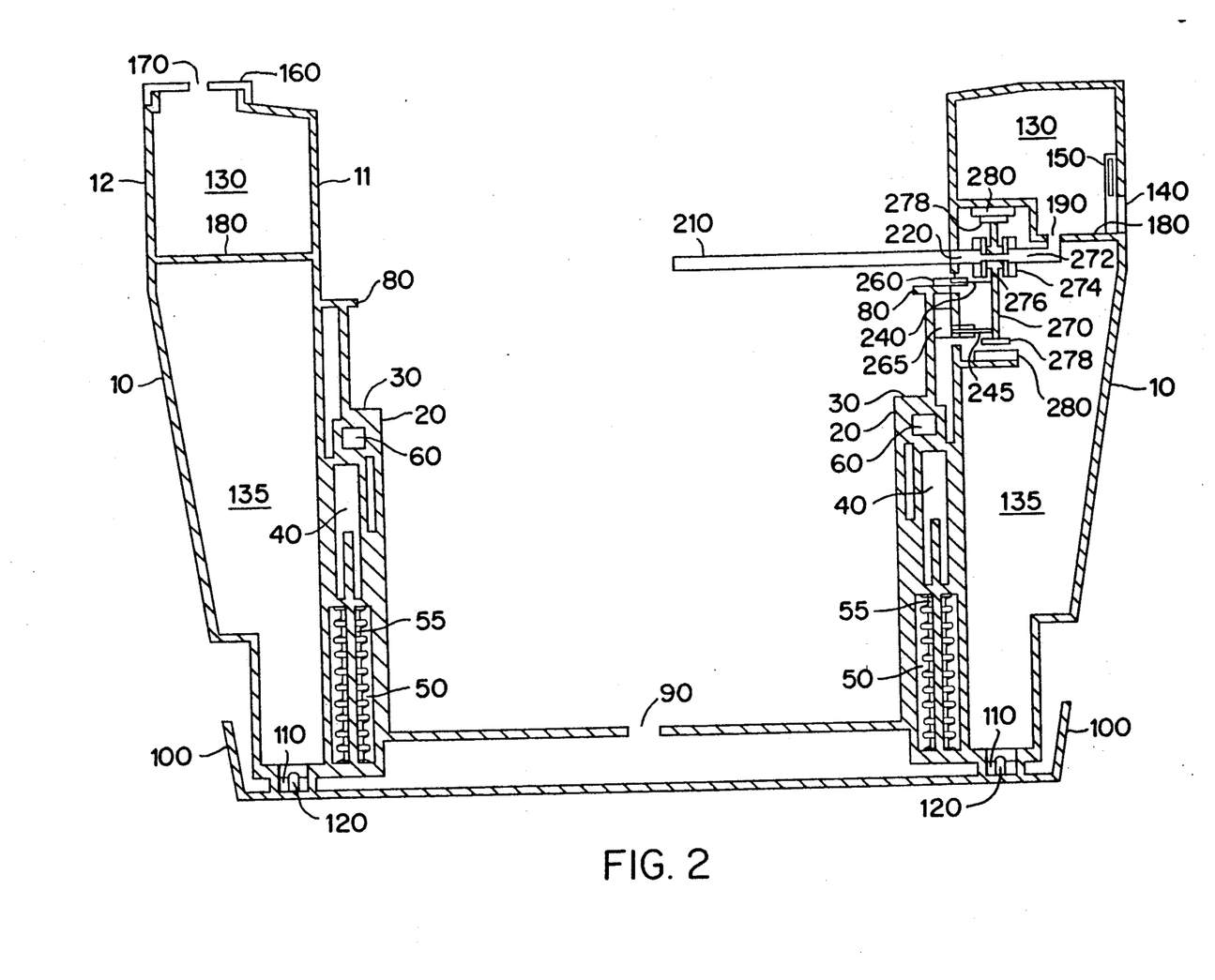
FIG. 2 is a cross-sectional view of the planter of FIG. 1 taken across line A—A'.
Figure 3:
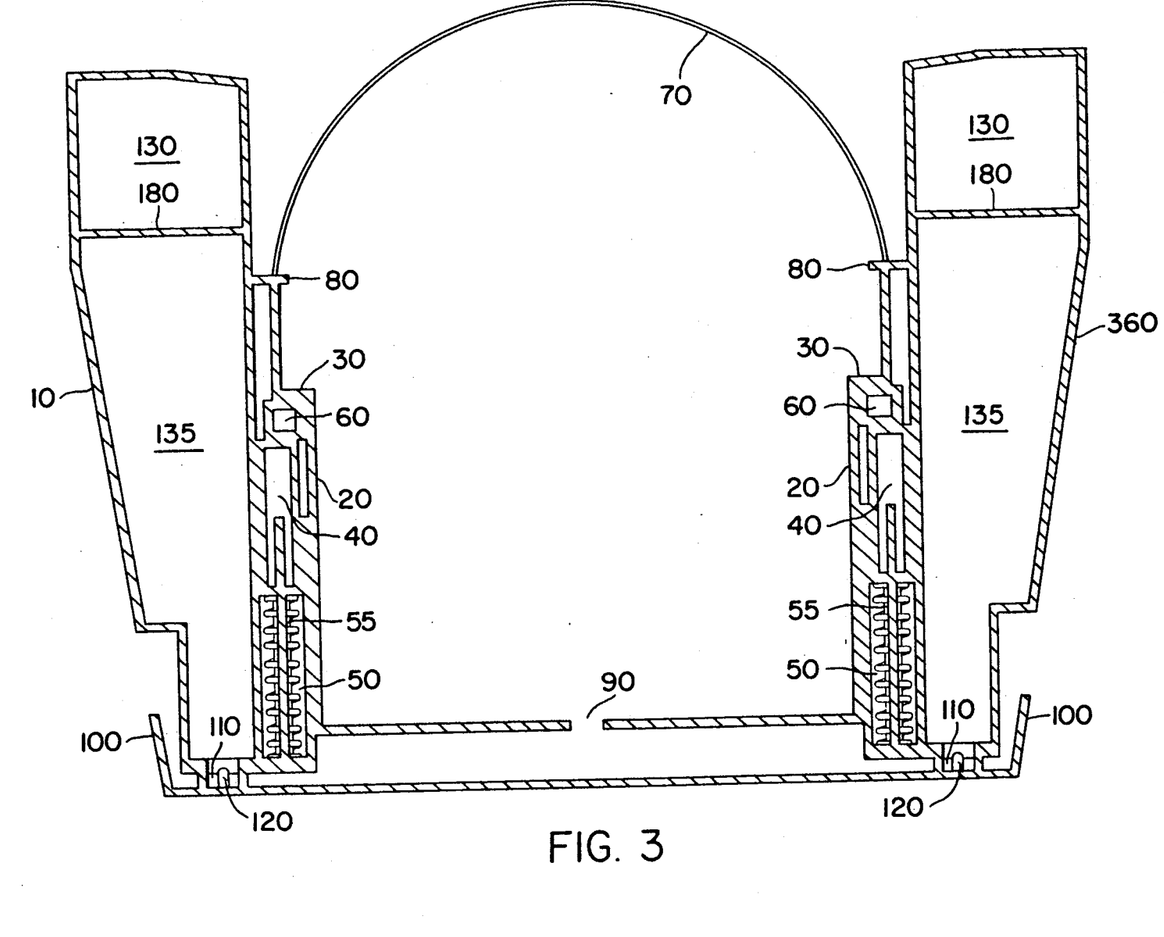
FIG. 3 is a cross-sectional view of the planter of FIG. 1 taken across line B—B'.

FIGS. 1 and 2 illustrate a first preferred embodiment of the present invention wherein a main housing unit 10 is provided that is of a generally cylindrical shape having a decreasing external diameter from top to bottom. The main housing unit is made of a rigid plastic material whose color and shape can be varied to appeal to a variety of tastes. The housing unit includes an interior wall 11 and an exterior wall 12. A liner 20 into which a plant is potted is removably inserted into the center of the housing unit. The liner is also made of a rigid plastic material. A ledge support unit 40, to be described later, supports the liner 20 in the housing unit under a horizontal surface 30 of the liner. As shown in FIG. 3, compression springs 50 are in contact with the bottom of the ledge unit 40 and are compressed by the weight of the liner 20. Springs 50 are held upright by the use of support pins 55. A cylindrical height adjustment ring unit such as a washer 60 is provided to adjust the height of the liner within the housing unit whereby the liner may be kept at an optimal height in the housing unit to ensure proper operation. A handle 70 is attached to an upper lip 80 of the liner which facilitates the insertion and removal of the liner into the housing unit. The handle 70 retracts onto the lip 80 when not in use and thereby does not interfere with the appearance of the planter unit. Drainage holes 90 are provided in the bottom of the liner to allow water drainage of the soil and a detachable drainage dish 100 is provided at the base of the housing unit to collect excess water from the liner. The drainage dish preferably is designed to be large enough to contain all excess water discharged from the reservoir in the event of a malfunction in the irrigation system. Holes 120 are provided in the bottom of the housing unit into which pins 110 contained within the dish are inserted to hold the dish in place.

As illustrated in FIGS. 2 and 3, the main housing unit 10 is divided into upper and lower compartments 130 and 135, respectively. Upper compartment 130 is a cylindrical water reservoir located between inner and outer walls 11 and 12 which contains a filler cap 160 for refilling of the reservoir with water. A small hole 170 is provided in the cap to equalize the pressure within the reservoir. A clear plastic window 140 is provided on the exterior of reservoir which, in conjunction with a float 150, indicates the level of the water within the reservoir to alert the user when the water level is low. A drain 190 is located at the bottom of the reservoir toward which the lower surface 180 of the reservoir dips to allow drainage of water therethrough. The lower compartment 135 is hollow except for the control circuitry which operates the irrigation system and a solid plastic weight which is placed in the lower compartment opposite to the circuitry to counterbalance the housing unit.

An elongated feeder tube 210 is removably attached to a nipple 220 which extends from the base of the water reservoir and allows water, to flow to the soil in the liner whenever a valve passage 272 is opened. The feeder tube can be designed to irrigate the liner at one location using a single tube or a two locations using a V shaped tube. As shown in FIG. 1, the housing unit can also be hung from a ceiling or other surface using ring attachments 380 that are provided near the top of the exterior wall.

As shown in FIG. 2, upper and lower magnets 280 are provided in conjunction with a valve column 270 which moves between the upper magnet and the lower magnet in accordance with the weight of the liner to open and close the valved passage 272 within a connector 274 which connects the reservoir drain to the nipple 220. In this embodiment, levers 240 and 245 are provided with extension units 260 and 265 which extend into the interior portion of the housing unit to be contacted by a lip 80 which is attached to the top of the liner. The column 270 contains a hole which aligns with valved passage 272 when in the open position and which is covered by a washer 276 when in the closed position. The extension units 260 and 265 are provided in a number of different thicknesses such that the thickness of the upper extension unit 260 can be increased downward and the thickness of the lower extension unit 265 can be decreased by different amounts to compensate for the varying position of the liner 20 in response to the varying weight thereof depending upon the size and type of plant potted therein and the different moisture requirements of the plant. Metal pieces 278 are attached to the ends of the column 270 which are attracted to the magnets 280 to lock the column in place when water is to be delivered or shut off from the feeder tube 210.

Figure 4:
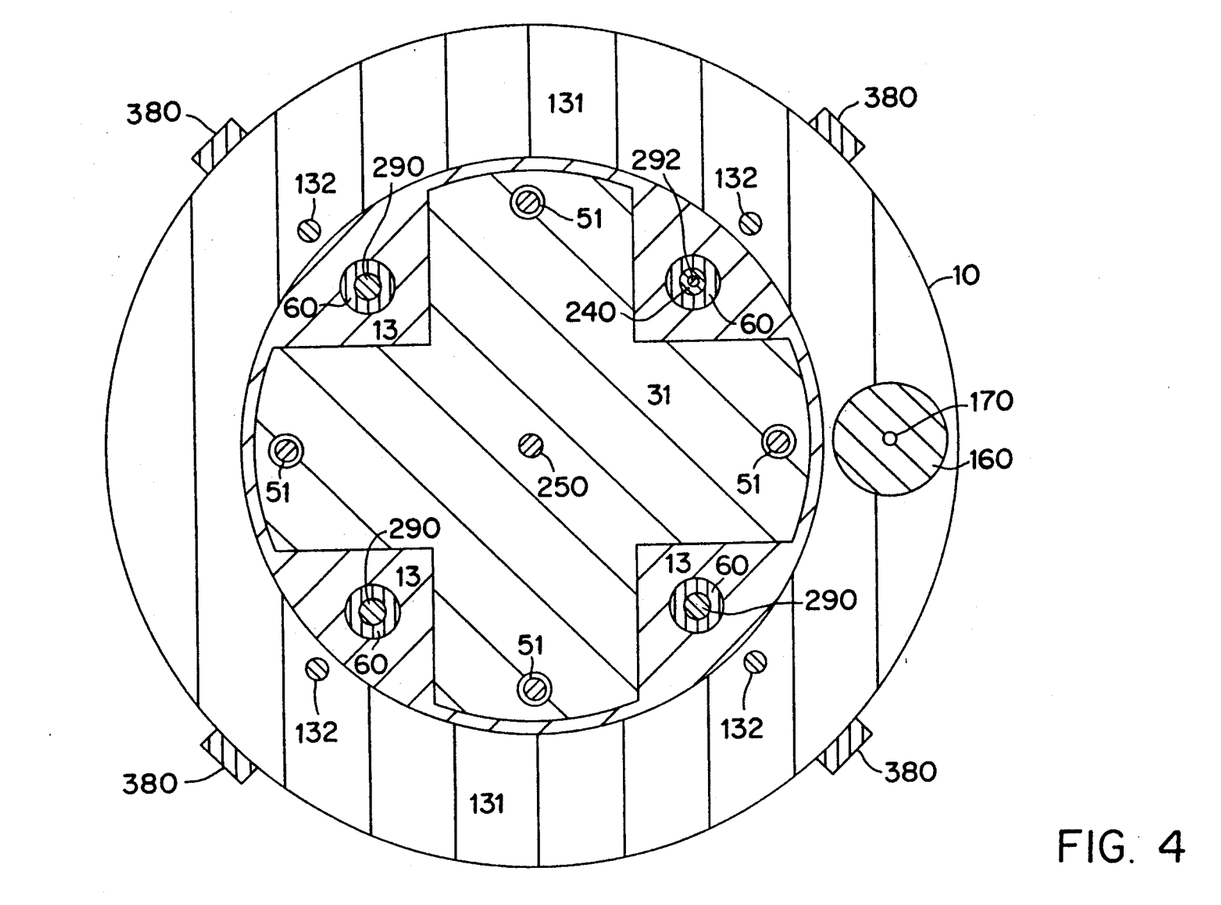
FIG. 4 is a plan view of the top of the self-watering planter of a second preferred embodiment of the present invention.
Figure 5:
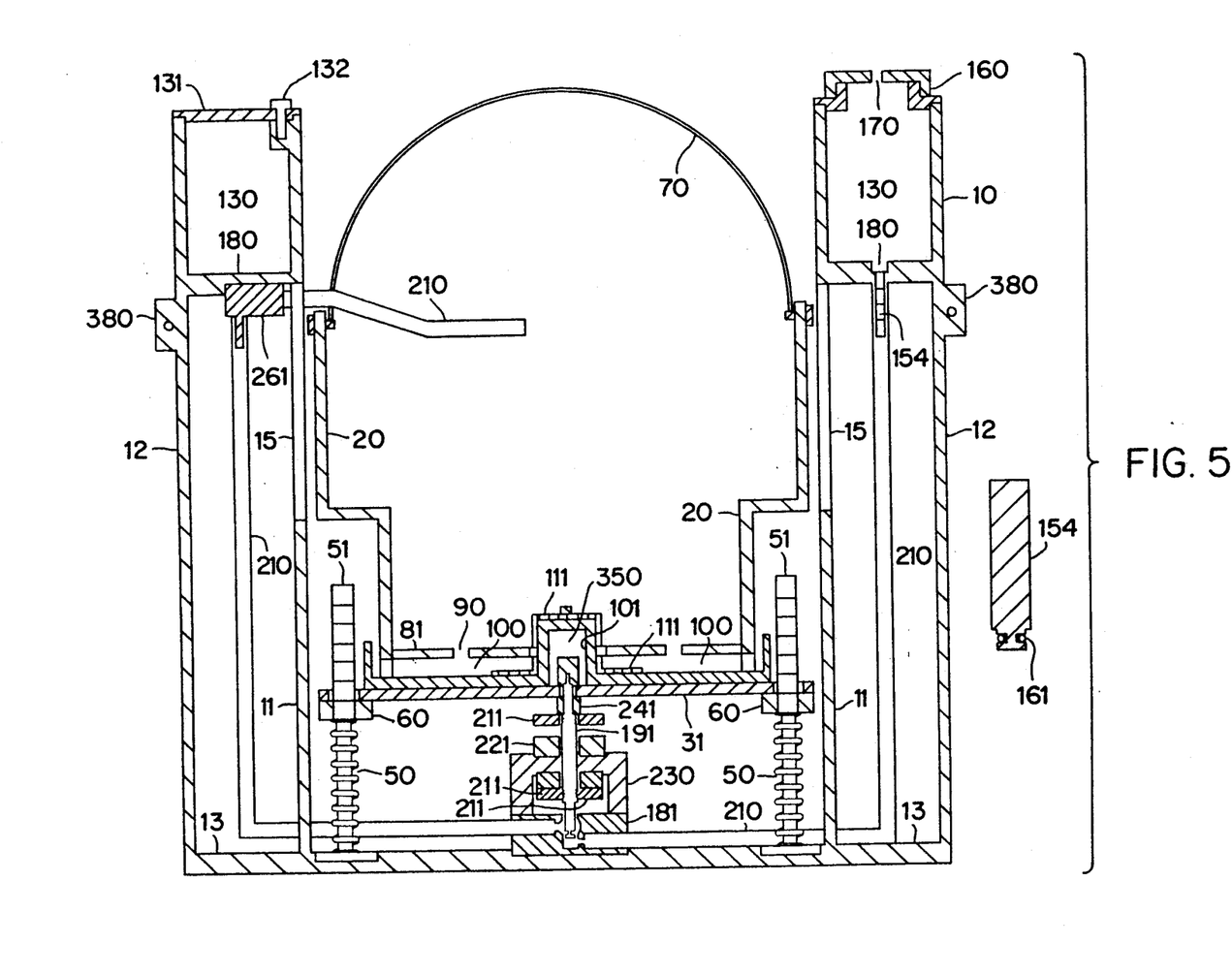
FIG. 5 is a cross-sectional view of the planter of FIG. 4 taken across line A—A'.
Figure 6:
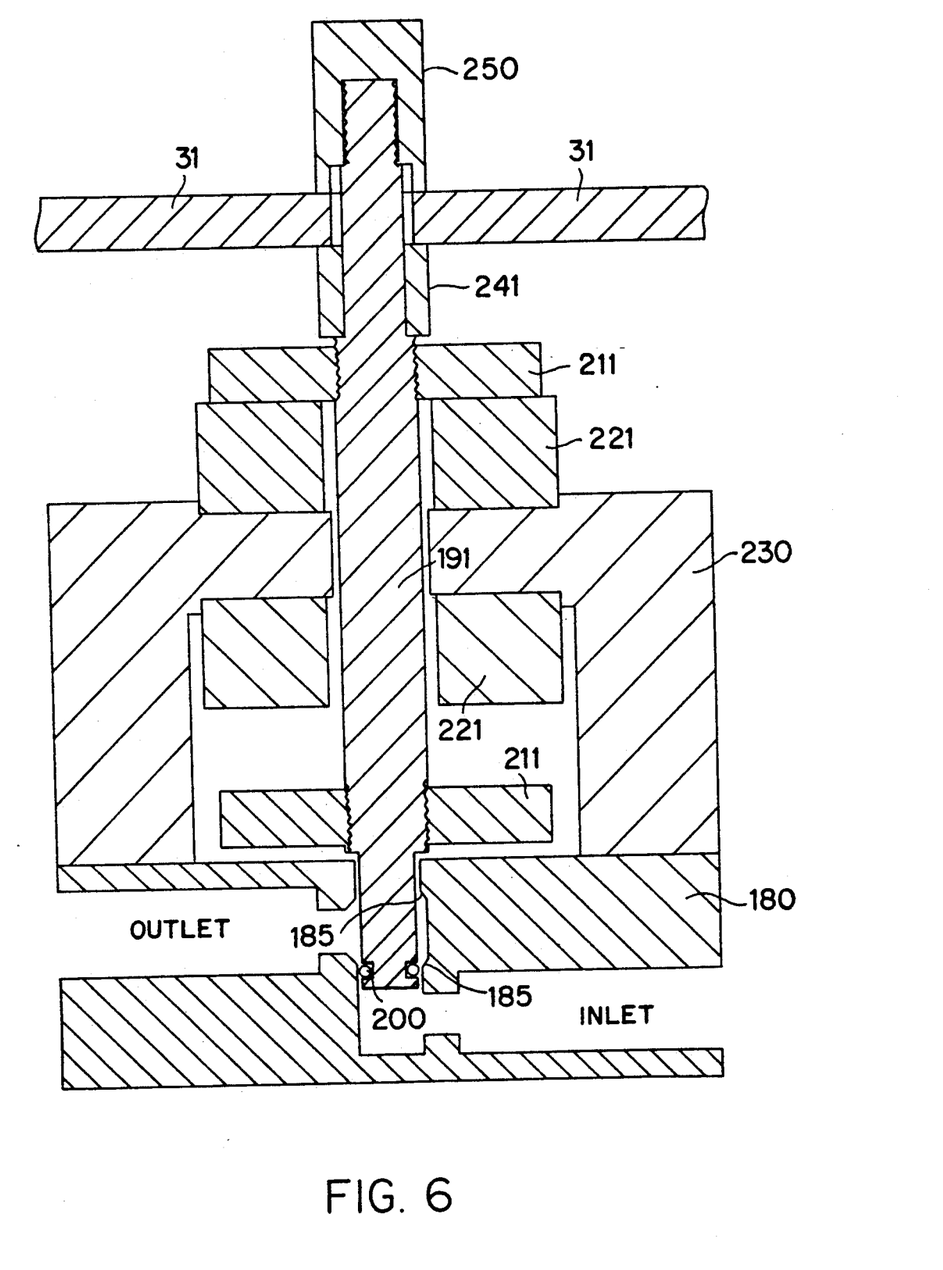
FIG. 6 is a detailed cross-sectional view of the valve assembly of FIG. 5.

FIGS. 4, 5 and 6 are illustrative of a second preferred embodiment of the present invention. With reference to FIGS. 4 and 5, a self-watering planter of a second embodiment of the invention comprises a main housing unit 10 including an interior wall 11 and an exterior wall 12. An opening 15 is provided in the interior wall 11 to enable access to the space therein. A base plate 31 is supported by a number of washers 60 which sit on compression springs 50. A number of posts 51 are set into the bottom of the housing unit to maintain the springs 50 in an upright position. A retractable handle 70 is attached to the top of the liner 20 to enable the liner to be easily removed from the housing unit. The liner 20 contains a false floor 81 having drainage holes 90 which allow excess water in the soil to drain into a drainage area 100. An inverted U-shaped bottom surface 101 of the liner is provided to accommodate a valve stem cap 250. The second preferred embodiment includes a wick element 111 which extends from the drainage area 100 into the interior surface of the liner to draw excess water from the drainage area back into the soil as the soil dries out.

At the top of the housing unit between the interior and exterior walls, a reservoir 130 is located, and is provided with a filler cap 160 having a pressure hole 170 to equalize the air pressure within the reservoir 130. The reservoir can be made of a clear material to permit an easy determination of the water level. The reservoir also contains a removable top 131 which is fastened to the reservoir body with a plurality of pins 132. The reservoir floor 180 contains at one location thereof a drain 190. A drain plug 154 is also shown which can be inserted into the drain to facilitate maintenance of the unit. A nipple 161 is attached to the drain which allows attachment of a flexible tubing 210 thereto.

With reference to FIG. 6, the valve assembly consists of a valve body 181 having horizontal inlet and outlet ports with an interior vertical passage in the center of the valve body allowing communication therebetween. A movable valve stem 191 has one end inserted into the interior passage of the valve body and includes an O-ring 200 at a terminal end thereof. A tapered groove 185 is provided at the center of the interior passage which keeps the O-ring from being damaged by the sharp edges created by the intersection of the outlet port with the interior passage. The taper further facilitates the movement of the valve stem O-ring from the illustrated closed position to an open position in which the O-ring is located at the top of the interior passage by reducing the friction between the passage and the O-ring.

The other end of the valve stem 191 is secured to the base plate 31 with a valve stem cap 250. First and second ring magnets 221 are mounted on a base 230 and surround the valve stem 191. First and second steel washers 211 are attached to the valve stem 191 above and below the respective magnets 221 by an attachment mechanism such as a threaded groove. However, it is to be noted that other modes of attaching the washers 211 to the valve stem 191 can equivalently be used. A washer 240 rests on a shoulder above the top washer 211. The thickness of washer 240 determines the weight of the liner at which the valve is closed.

The washers 60 are replaceable with washers of varying thicknesses to ensure proper operation of the planter irrespective of the weight of the liner, due to either different sized plants or growth of a particular plant potted therein. The washer thicknesses are varied to maintain the moisture level at which the valve is opened constant, due to the constant force of the compression springs 50. For example, as the liner increases in weight, a greater force is exerted on the compression springs 50 which causes them to compress. Therefore, washers 60 will be replaced in this instance by washers of greater thickness to allow the lower steel washer 211 to come into contact with the lower ring magnet 221 to open the valve when the soil is at a certain level of dryness, regardless of the weight of the liner due to a bigger plant. Washer 240 is replaced with varying washer thickness to adjust the total amount of water delivered to the soil. For example, the maximum amount of water will be delivered when washer 240 is absent, forcing the base plate 31 to move a maximum distance before contacting the shoulder of the valve stem 191 causing a downward motion.

Referring again to FIG. 5, a connector 261 is provided which connects a feeder tube 210 extending over the top of the liner, to a segment of flexible tubing 210 attached to the outlet port of the valve body 181.

Hanger attachments 280 are integrally formed in the exterior wall 12 of the housing unit to allow hanging of the unit from a trellis or ceiling.

As shown in FIG. 4, a plurality of storage pins 290 and 292 are provided in the base of the housing unit to store washers 60 of different thicknesses which may be used to replace the washers mounted on the compression springs as the plant grows within the liner.

The planter operates as follows. As the soil is watered, the weight of the liner increases. This increased weight exerts a force on the springs which causes downward movement of the base plate 31 toward the washer 241. Watering will continue until the liner has reached its second specific value at which the valve is closed.

As evaporation occurs, the weight of the liner decreases. The reduced force on the springs causes an upward movement of the base plate, forcing the valve stem cap 250 upward. Evaporation will continue until the weight of the liner reaches the first specific value at which point the valve is opened to restart watering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self-watering planter, comprising:
   a housing unit;
   a reservoir located within said housing unit;
   as liner to be filled with soil into which a plant is potted, removably located within said housing unit;
   weight determination means for determining the weight of said liner, the weight of the liner being indicative of the moisture content of the soil;
   an elongated feeder tube communicating with said reservoir and terminating over said liner for hydrating the soil within said liner;
   valve means connecting said tube to said reservoir for selectively allowing water to be delivered from said reservoir to said soil; and
   control means, responsive to said weight determination means, for opening and closing said valve means when the weight of said liner reaches first and second specific values representative of dehydrated and hydrated soil conditions, respectively, said control means including,
   a movable valve stem connecting said valve means to said weight determination means,
   first and second magnetic elements mounted adjacent first and second ends of said valve stem,
   a first magnetizable washer mounted on said valve stem above said first magnetic element, and
   a second magnetizable washer mounted on said valve stem below said second magnetic element,
   said first magnetic element contacting said first magnetizable washer when the weight of said liner reaches said second specific value to bias said valve means closed, and
   said second magnetic element contacting said second magnetizable washer when the weight of said liner reaches said first specific value to bias said valve means open;
   wherein said housing unit includes a base plate for supporting said liner and having an aperture in the center thereof, wherein said base plate is mounted within said housing unit on spring means for supporting said base plate around the periphery thereof and providing a predetermined resistance against the weight of said liner and wherein said base plate includes a plurality of apertures around the periphery thereof, and said spring means includes a plurality of post-supported springs, each post protruding through a respective peripheral aperture of said base plate.

2. The self-watering planter defined in claim 1, wherein said valve means comprises:
   a valve body having an inlet port connected to said reservoir, an outlet port connected to said elongated tube, and an interior passage interconnecting said inlet and outlet ports;
   one end of said valve stem inserted into said interior passage including an O-ring at a terminus of said valve stem and allowing communication between said inlet and outlet ports when said valve means is open, and blocking communication between said inlet and outlet ports when said valve means is closed;
   said interior passage including a tapered groove at the center thereof and first and second valve lips at either end of said tapered groove,
   said tapered groove contacting said O-ring and facilitating movement of said valve stem end between said first and second lips.

3. The self-watering planter defined in claim 1, wherein said liner includes an apertured floor through which excess water drains into a compartment therebelow.

4. The self-watering planter defined in claim 1, wherein said liner includes a retractable handle for facilitating removal from said housing unit.

5. A self-watering planter, comprising:
   a housing unit;
   a reservoir located within said housing unit;
   a liner to be filled with soil into which a plant is potted, removably located within said housing unit;
   weight determination means for determining the weight of said liner, the weight of the liner being indicative of the moisture content of the soil;
   an elongated feeder tube communicating with said reservoir and terminating over said liner for hydrating the soil within said liner;
   valve means connecting said tube to said reservoir for selectively allowing water to be delivered from said reservoir to said soil; and
   control means, responsive to said weight determination means, for opening and closing said valve means when the weight of said liner reaches first and second specific values representative of dehydrated and hydrated soil conditions, respectively, said control means including,
   a movable valve stem connecting said valve means to said weight determination means,
   first and second magnetic elements mounted adjacent said valve stem,
   a first magnetizable washer mounted on said valve stem above said first magnetic element, and
   a second magnetizable washer mounted on said valve stem below said second magnetic element,
   said first magnetic element contracting said first magnetizable washer when the weight of said liner reaches said second specific value to bias said valve means closed, and
   said second magnetic element contacting said second magnetizable washer when the weight of said liner reaches said first specific value to bias said valve means open;
   wherein said valve means comprises:
   a valve body having an inlet port connected to said reservoir, an outlet port connected to said elongated tube, and an interior passage interconnecting said inlet and outlet ports;

one end of said valve stem inserted into said interior passage including an O-ring at a terminus thereof and allowing communication between said inlet and outlet ports when said valve means is open, and blocking communication between said inlet and outlet ports when said valve means is closed;

said interior passage including a tapered groove at the center thereof and first and second valve lips at either end of said tapered groove, said tapered groove contacting said O-ring and facilitating movement of said valve stem end between said first and second lips.

6. The self-watering planter defined in claim 5, wherein said housing unit includes a base plate for supporting said liner and having an aperture in the center thereof;

the other end of said valve stem protruding through said aperture and being secured to said base plate by a valve stem cap attached thereto.

7. The self-watering planter defined in claim 6, wherein said base plate is mounted within said housing unit on spring means for supporting said base plate around the periphery thereof and providing a predetermined resistance against the weight of said liner.

8. The self-watering planter defined in claim 7, wherein said base plate includes a plurality of apertures around the periphery thereof, and said spring means includes a plurality of post-supported springs, each post protruding through a respective peripheral aperture of said base plate.

9. The self-watering planter defined in claim 5, wherein said liner includes an apertured floor through which excess water drains into a compartment therebelow.

* * * * *

UNITED STATES PATENT AND TRADEMARK OFFICE
CERTIFICATE OF CORRECTION

PATENT NO. : 5,020,261

DATED : June 4, 1991

INVENTOR(S) : Fred W. Lishman

It is certified that error appears in the above-identified patent and that said Letters Patent is hereby corrected as shown below:

The sheets of drawings should be deleted to appear as per attached sheets.

Signed and Sealed this

Ninth Day of March, 1993

*Attest:*

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5,020,261

DATED : June 4, 1991

INVENTOR(S) : Fred W. Lishman

It is certified that error appears in the above-identified patent and that said Letters Patent is hereby corrected as shown below:

FIG. 1

UNITED STATES PATENT AND TRADEMARK OFFICE
CERTIFICATE OF CORRECTION

PATENT NO. : 5,020,261  Page 3 of 7
DATED : June 4, 1991
INVENTOR(S) : Fred W. Lishman It is certified that error appears in the above-identified patent and that said Letters Patent is hereby corrected as shown below:

FIG. 2

UNITED STATES PATENT AND TRADEMARK OFFICE
CERTIFICATE OF CORRECTION

PATENT NO. : 5,020,261   Page 4 of 7
DATED : June 4, 1991
INVENTOR(S) : Fred W. Lishman It is certified that error appears in the above-identified patent and that said Letters Patent is hereby corrected as shown below:

FIG. 3

UNITED STATES PATENT AND TRADEMARK OFFICE
CERTIFICATE OF CORRECTION

PATENT NO. : 5,020,261  Page 5 of 7
DATED : June 4, 1991
INVENTOR(S) : Fred W. Lishman It is certified that error appears in the above-identified patent and that said Letters Patent is hereby corrected as shown below:

FIG. 4

UNITED STATES PATENT AND TRADEMARK OFFICE
CERTIFICATE OF CORRECTION

PATENT NO. : 5,020,261

DATED : June 4, 1991

INVENTOR(S) : Fred W. Lishman

Page 6 of 7

It is certified that error appears in the above-identified patent and that said Letters Patent is hereby corrected as shown below:

FIG. 5

UNITED STATES PATENT AND TRADEMARK OFFICE
CERTIFICATE OF CORRECTION

PATENT NO. : 5,020,261

DATED : June 4, 1991

INVENTOR(S) : Fred W. Lishman

It is certified that error appears in the above-identified patent and that said Letters Patent is hereby corrected as shown below:

FIG. 6